(12) United States Patent
Ganta

(10) Patent No.: US 11,767,087 B2
(45) Date of Patent: Sep. 26, 2023

(54) AUTOMATED METHOD FOR NOSE CONE MANUFACTURING

(71) Applicant: FabX Industries, Inc., Greenville, MI (US)

(72) Inventor: Gopi Ganta, Elkhart, IN (US)

(73) Assignee: FabX Industries, Inc., Greenville, MI (US)

( * ) Notice: Subject to any disclaimer, the term of this patent is extended or adjusted under 35 U.S.C. 154(b) by 0 days.

(21) Appl. No.: 17/853,209

(22) Filed: Jun. 29, 2022

(65) Prior Publication Data

US 2023/0002020 A1 Jan. 5, 2023

Related U.S. Application Data

(60) Provisional application No. 63/217,215, filed on Jun. 30, 2021.

(51) Int. Cl.
| | |
|---|---|
| *B63B 73/43* | (2020.01) |
| *B23K 9/028* | (2006.01) |
| *B23K 101/00* | (2006.01) |
| *B63B 35/34* | (2006.01) |
| *B21D 5/01* | (2006.01) |
| *B23K 37/04* | (2006.01) |
| *B23K 37/053* | (2006.01) |

(52) U.S. Cl.
CPC .............. *B63B 73/43* (2020.01); *B23K 9/028* (2013.01); *B21D 5/015* (2013.01); *B23K 37/0435* (2013.01); *B23K 37/0533* (2013.01); *B23K 2101/006* (2018.08); *B63B 35/34* (2013.01)

(58) Field of Classification Search
CPC ............ B23K 37/0533; B23K 37/0435; B21D 5/015; B21C 37/08; B63B 73/43
See application file for complete search history.

(56) References Cited

U.S. PATENT DOCUMENTS

| | | | | |
|---|---|---|---|---|
| 3,732,614 | A | * | 5/1973 | Boutell ............... B21C 37/0815 228/150 |
| 3,802,239 | A | * | 4/1974 | Karmann .............. B21C 37/185 72/368 |
| 4,110,577 | A | * | 8/1978 | Spisak ............... B23K 37/0535 219/121.36 |
| 4,476,194 | A | * | 10/1984 | Sanborn .................. B23P 15/00 428/595 |
| 4,513,596 | A | * | 4/1985 | Usher .................... B21D 39/02 72/213 |
| 4,735,076 | A | * | 4/1988 | Zeugin ..................... B21D 5/14 72/368 |
| 6,135,343 | A | * | 10/2000 | Thorngren ............. B21D 51/10 228/141.1 |

(Continued)

*Primary Examiner* — Michael W Hotchkiss
(74) *Attorney, Agent, or Firm* — Sanders Pianowski LLP

(57) ABSTRACT

A system and method for automatically joining a cut blank has a mandrel and clamps to conform the cut blank to the mandrel. The clamps include band clamps and pad clamps that pivot about axes that are obliquely angled with respect to the centerline of the mandrel. The clamp axes on one side of the centerline are a mirror image to the clamp axes on the other side. The cut blank has a line of symmetry and is clamped to the centerline of the mandrel with a locator bar. The clamps are then moved to a clamped position. In the clamped position, one edge of the cut blank meets another edge, and a robotic welder joins the edges.

19 Claims, 15 Drawing Sheets

(56) References Cited

U.S. PATENT DOCUMENTS

| | | | | |
|---|---|---|---|---|
| 7,350,386 | B2* | 4/2008 | Streubel | B21C 37/0815 |
| | | | | 228/151 |
| 7,669,448 | B1* | 3/2010 | Gharib | B21C 37/0815 |
| | | | | 72/213 |
| 7,739,975 | B1* | 6/2010 | Manderfeld | B63B 3/12 |
| | | | | 114/356 |
| 7,798,088 | B2* | 9/2010 | Hoover | B21D 11/10 |
| | | | | 114/356 |
| 7,870,830 | B2* | 1/2011 | Bogard | B63B 35/613 |
| | | | | 114/61.2 |
| 10,160,031 | B2* | 12/2018 | Higai | B21D 9/08 |
| 11,110,508 | B2* | 9/2021 | Stolp | B21C 37/101 |
| 11,446,775 | B2* | 9/2022 | Schahuber | B23K 9/0282 |
| 2006/0151572 | A1* | 7/2006 | Yamaoka | B23K 37/0443 |
| | | | | 228/47.1 |
| 2010/0095729 | A1* | 4/2010 | Schrunk | B23K 37/0435 |
| | | | | 72/252.5 |
| 2010/0244347 | A1* | 9/2010 | Davi | B21C 37/0803 |
| | | | | 269/71 |
| 2020/0078843 | A1* | 3/2020 | Ford | B21D 51/10 |

* cited by examiner

AUTOMATED METHOD FOR NOSE CONE MANUFACTURING

CROSS REFERENCE TO RELATED APPLICATIONS

This application claims the benefit of Provisional Application Ser. No. 63/217,215 filed Jun. 30, 2021, the disclosures of which is incorporated by reference.

BACKGROUND OF THE INVENTION

This present disclosure relates to aluminum pontoons, namely the front or nose cone portion. To date, manufacturing of nose cone components has been a manual task. The geometry of the nose cone has a curved leading edge which transitions to a circle. The circular portion is where the nose cone is welded to the rest of the pontoon. For the first step in the manual process, the user takes a piece of sheet metal that is cut to a specific shape and rolls it to begin shaping it. The user then works it around a form to join edges. Joining the edges requires the user to manually adjust and fit the edges, along with forming and shaping the metal to fit. This step is time-consuming and requires skill. The edges are then welded together, making a complete nose cone assembly. Subsequently, the nose cone assembly is welded to a pontoon. Manual forming can create distortion, warping, or irregularity, which must be corrected before the nose cone is welded to the pontoon. The manual steps generate a significant amount of variation between nose cones, which creates alignment and quality issues when mating the nose cone to the rest of the pontoon. Further, with the increased power in pontoon boats, thicker gauge material is needed for strength. Forming this thicker material is outside of the strength of some users and could cause repetitive motion injuries in others. An improved method of manufacturing is needed.

SUMMARY OF THE INVENTION

The present disclosure describes an automated process for shaping, forming, and welding nose cone assemblies. First, the user takes a blank and places it between rollers to form it to a rolled blank. Second, the user takes the rolled blank and places it onto a support form and aligns it using notches cut into the blank that mate to alignment pins on the machine. The machine has a mandrel, strap clamps, and pad clamps. The strap clamps have a strap that is held at the ends and the pad clamps have pads that are pivotable. The strap clamps and pad clamps are movable between an unclamped position and a clamped position, which move with actuators. The actuators are in communication with a control system that moves them to predetermined/programmed positions. In the clamped position, the rolled blank is held against the mandrel with one of the edges in contact. Next, the robotic welder begins welding the contacting edges of the rolled blank. The clamps may move during welding to provide clearance for the welder. At the end of the welding, the clamps return to their unclamped positions and the completed assembly is removed.

DESCRIPTION OF THE PREFERRED EMBODIMENT

Figure 1:
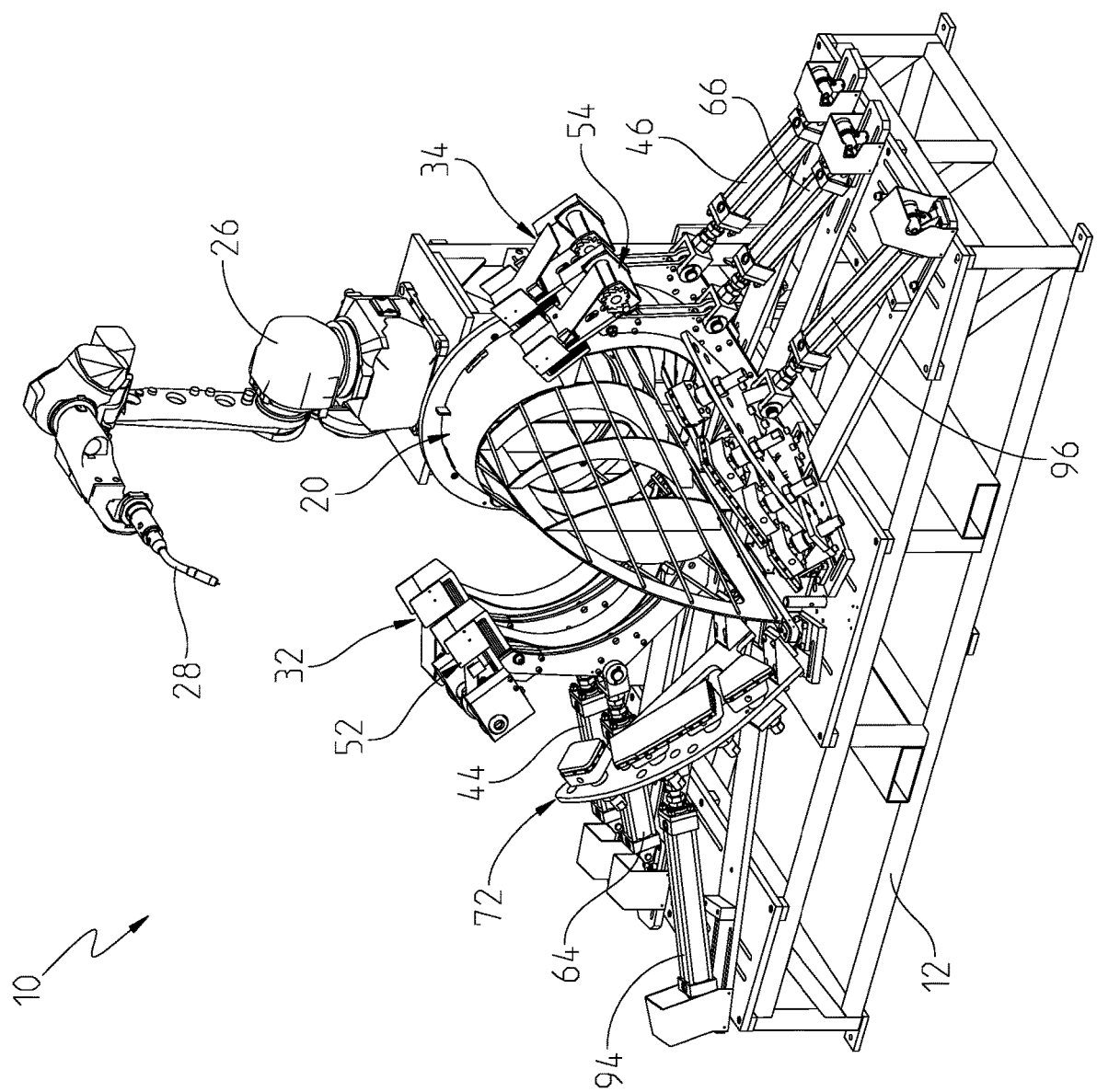
FIG. 1 is a front isometric view of the nose cone forming machine.
Figure 5:
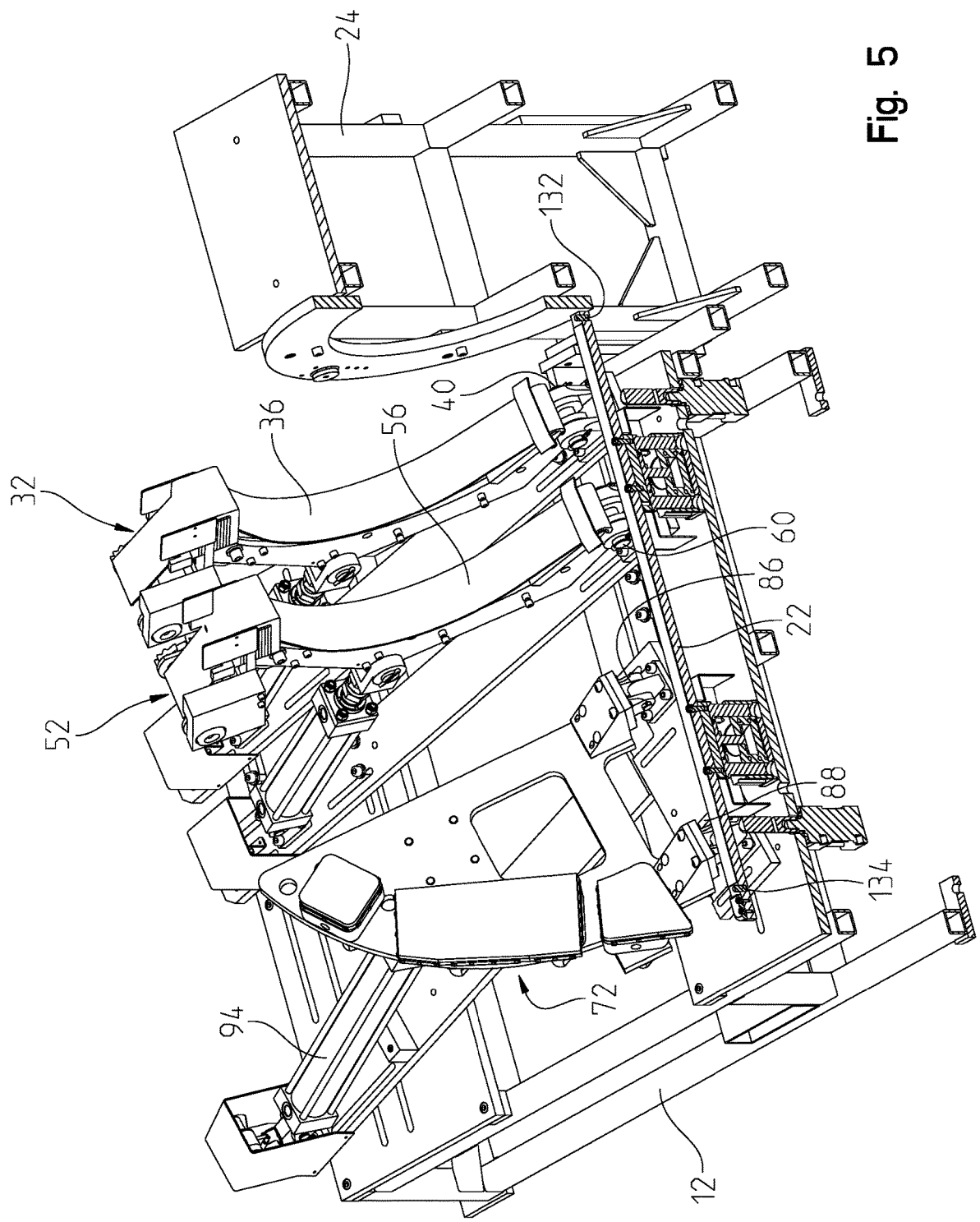
FIG. 5 is an isometric section view 5-5 of the machine in FIG. 4 without the mandrel shown.
Figure 13:
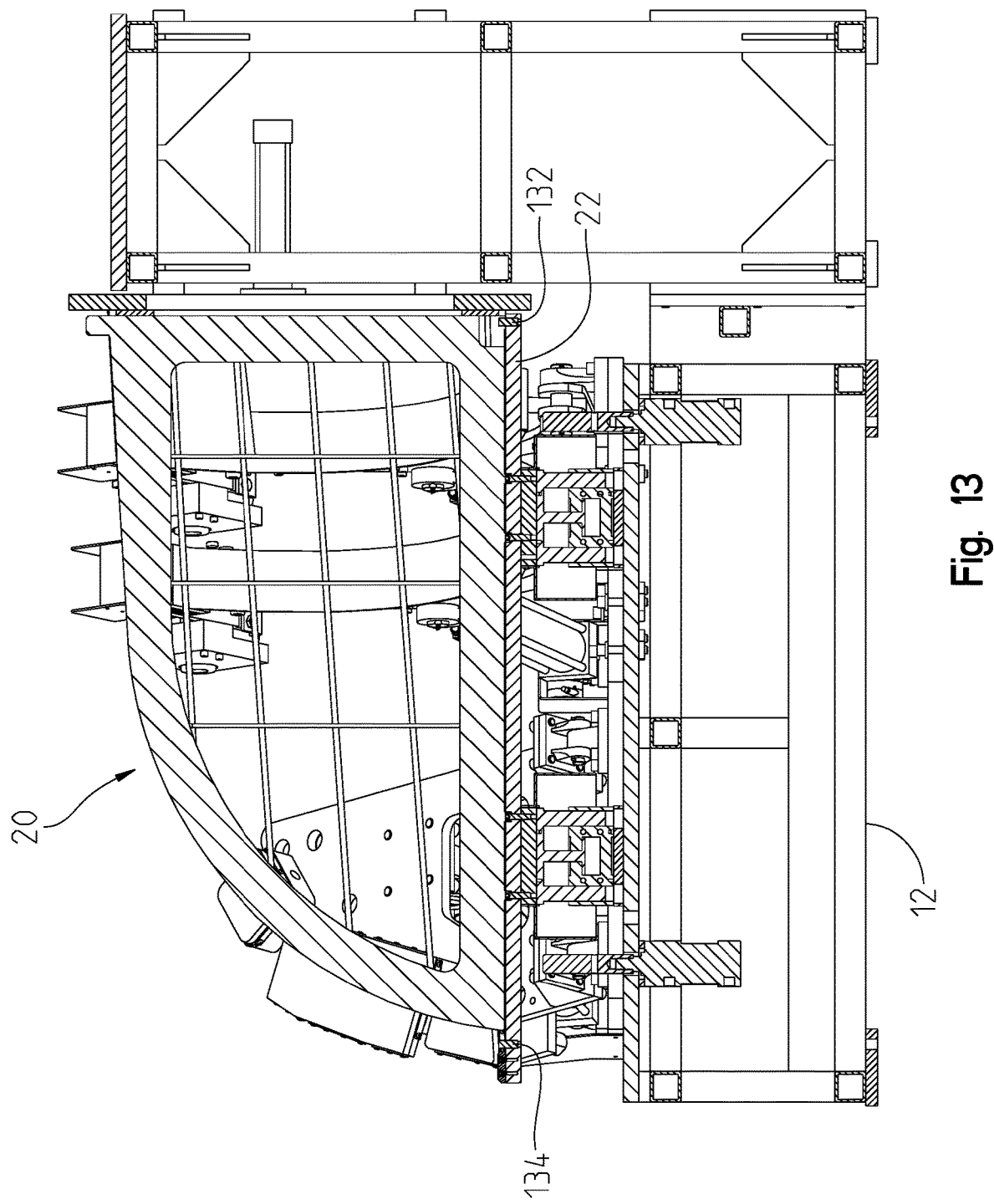
FIG. 13 is a side section view 13-13 of the machine in FIG. 3.

The nose cone forming machine 10 is shown in FIG. 1 and has several main components. The machine 10 consists of a base frame 12 in which a plurality of forming and clamping devices are attached. The machine 10 has an interchangeable mandrel 20 (skeleton) made to the internal shape of the pontoon size and brand. The machine 10 has a locator bar 22 under the mandrel 20 that rises to the mandrel 20 to act as a holding clamp. An additional riser frame 24 is affixed to the base frame 12 or integrated therewith. The riser frame 24 supports the forming mandrel 20 and also acts as a mounting surface for a robotic welder 26. The machine 10 is designed to take a partially rolled aluminum blank 100 and form the blank around the mandrel 20 using hydraulic cylinders. The machine 10 is capable of handling different sizes of nose cones utilizing tooling that can be changed to accommodate the different sizes. With the exception of the robotic welder 26, the machine 10 is symmetrical about a plane of symmetry 138 that extends through the mandrel 20 and locator bar 22. Section views in FIGS. 5 and 13 are taken through the plane of symmetry 138.

Figure 2:
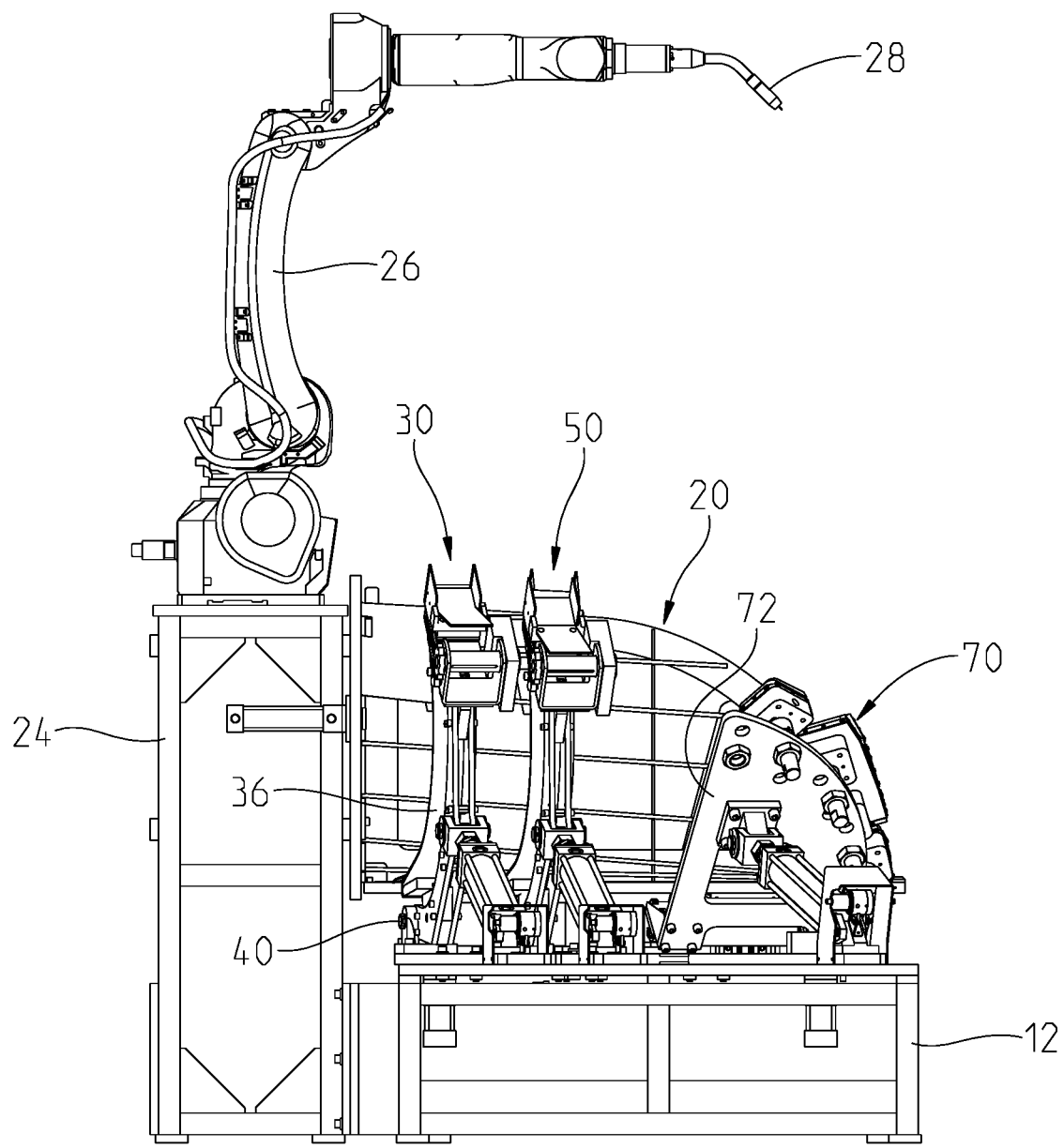
FIG. 2 is a left side view of the machine in FIG. 1.
Figure 3:
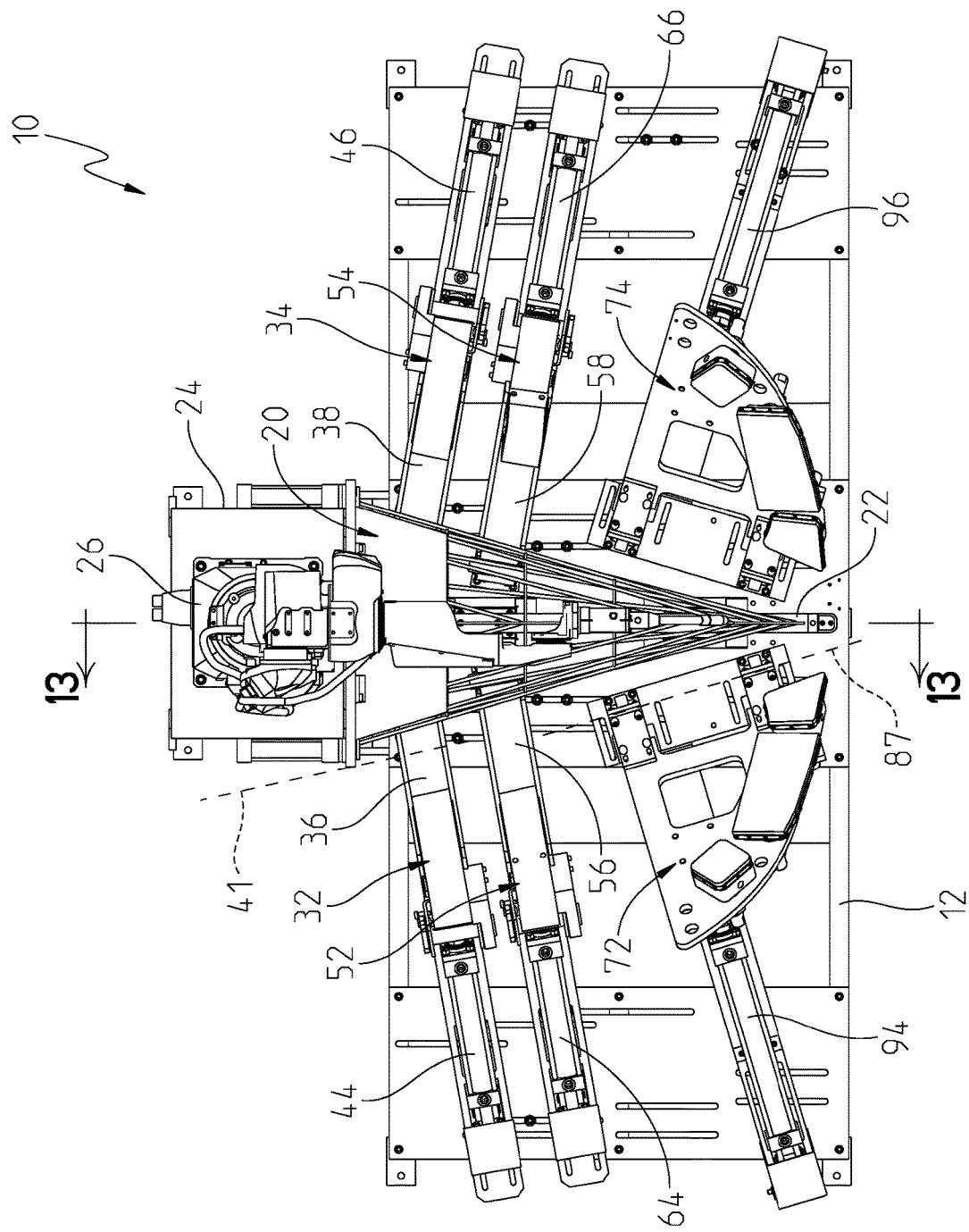
FIG. 3 is a top view of the machine in FIG. 1.
Figure 4:
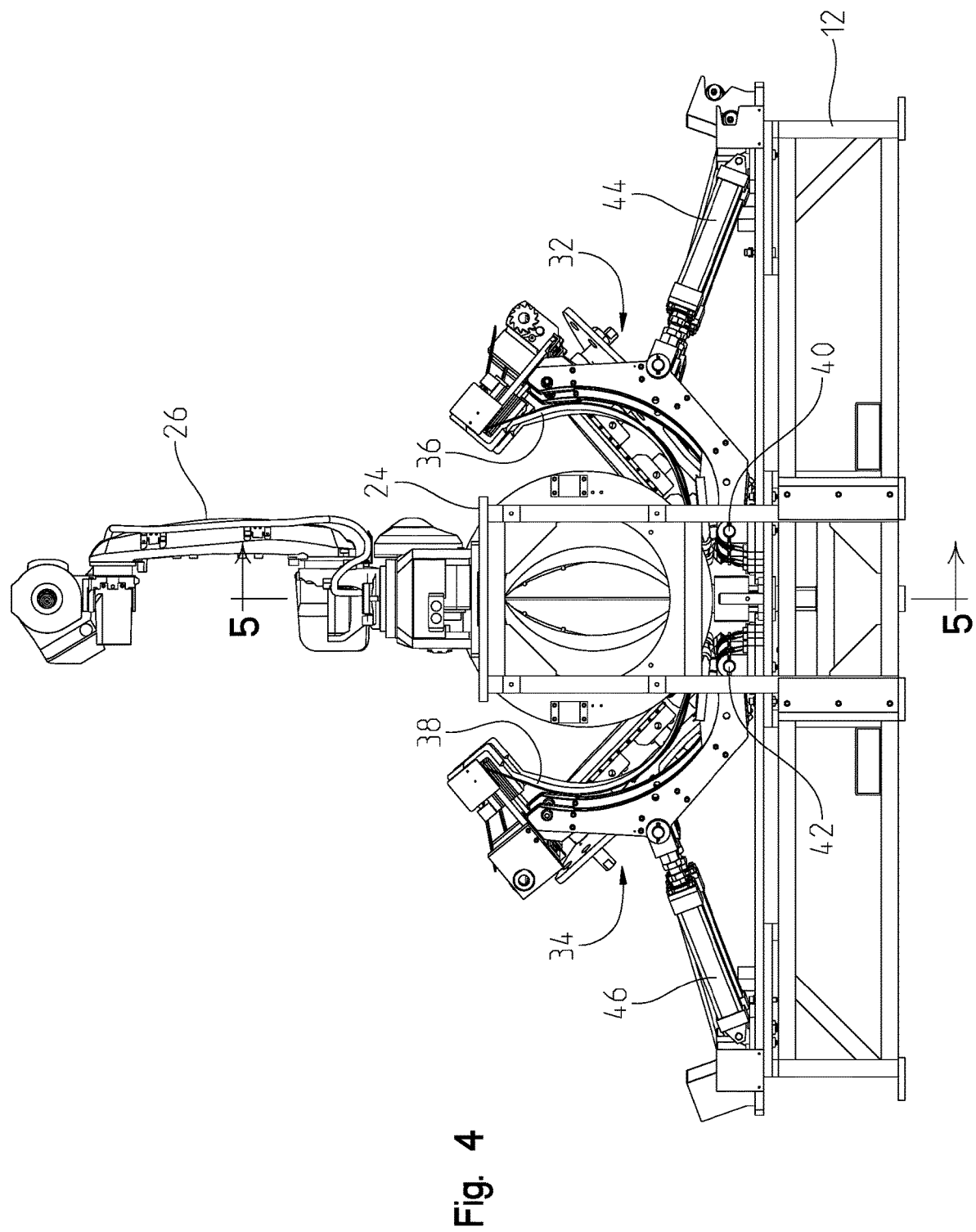
FIG. 4 is a rear view of the machine in FIG. 1.
Figure 14:
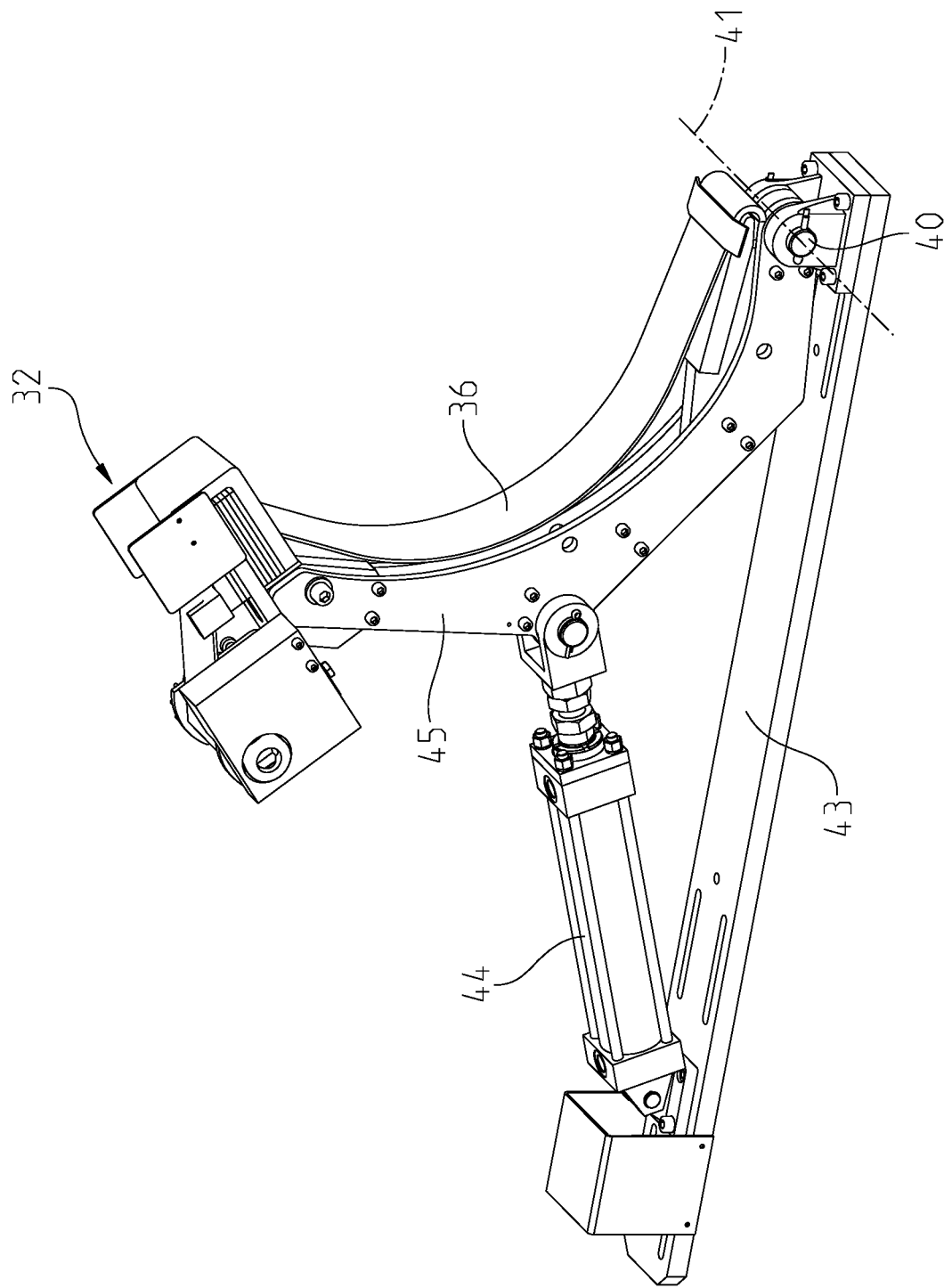
FIG. 14 is an isometric view of a rear clamping assembly.

Turning now to the details of the machine 10, the base frame 12 as shown has three clamping and forming sections, a rear band clamp pair 30, a center band clamp pair 50, and a front clamp pair 70. As shown in FIG. 2, the rear band clamp pair 30 is located closest to the riser frame 24 and where the mandrel 20 is attached. The rear band clamp pair 30 has a first side 32 and a second side 34. The details of the first side 32 are shown in FIG. 14, with the second side 34 having a similar structure. The first side 32 has a lower frame member 43 that is affixed to the base frame 12 and holds the pivot 40 and one end of the actuator 44. The other end of the actuator 44 is connected to the strap holder 45. The strap holder 45 holds a strap 36 that is fixed at one end and can be adjusted on the opposite end. The lower frame member 43 is perpendicular to a strap pivot axis 41. As shown in FIG. 3, the strap pivot axis 41 is at an oblique angle with respect to the plane of symmetry 138. The second side 34 is at a mirrored position with respect to the first side 32. As with the first side 32, the second side 34 pivots about an axis that is obliquely angled with respect to the plane of symmetry 138. The strap holder 45 pivots about the strap pivot axis 41 when the actuator 44 moves. Each side 32, 34 has its own strap 36, 38, which is a flexible material that resists stretching under tension. The straps 36, 38 are secured on the ends and can be adjusted. Each side 32, 34 has a corresponding pivot 40, 42 and an actuator 44, 46. The actuators 44, 46 are shown as hydraulic cylinders, but other devices are contemplated, such as air, electric, or other mechanical controls. The actuators 44, 46 are movable between a retracted position and an extended position that correspond with an unclamped position and clamped position of the first and second sides 32, 34. In the retracted position, the straps 36, 38 are slack and in the extended position, the sides 32, 34 are in the clamped position with the straps tight against the blank 100. In the clamped position, there may be a gap between the sides which allows clearance for the welder 26. As can be seen in FIG. 3, the first side 32 and second side 34 are at an angle with respect to each other and the mandrel 20. This is to provide clamping of the blank 100 that keeps the strap parallel to the outside surface of the blank 100 as it is clamped around the mandrel 20. The center band clamp pair 50 is similarly structured to the rear band clamp pair 30.

As shown in FIG. 2, the center band clamp pair 50 is located adjacent the rear band clamp pair 30 and shares the same features. The center band clamp pair 50 has a first side 52 and a second side 54. Each side 52, 54 has a corresponding strap 56, 58. Each side 52, 54 has a corresponding pivot 60, 62 and an actuator 64, 66. The actuators 64, 66 are shown as hydraulic cylinders, but other devices are contemplated, such as air, electric, or other mechanical controls. The actuators 64, 66 are movable between a retracted position and an extended position that correspond with an unclamped position and clamped position of the first and second sides 52, 54. In the retracted position, the straps 56, 58 are slack and in the extended position, the sides 52, 54 are in the clamped position with the straps tight against the blank 100. As with the rear band clamp pair 30, the first side 52 and second side 54 are at an oblique angle with respect to each other and the mandrel 20. This is shown in FIG. 3. As with the rear band clamp pair 30, the first and second sides 52, 54 are mirrored about the plane of symmetry 138.

Figure 15:
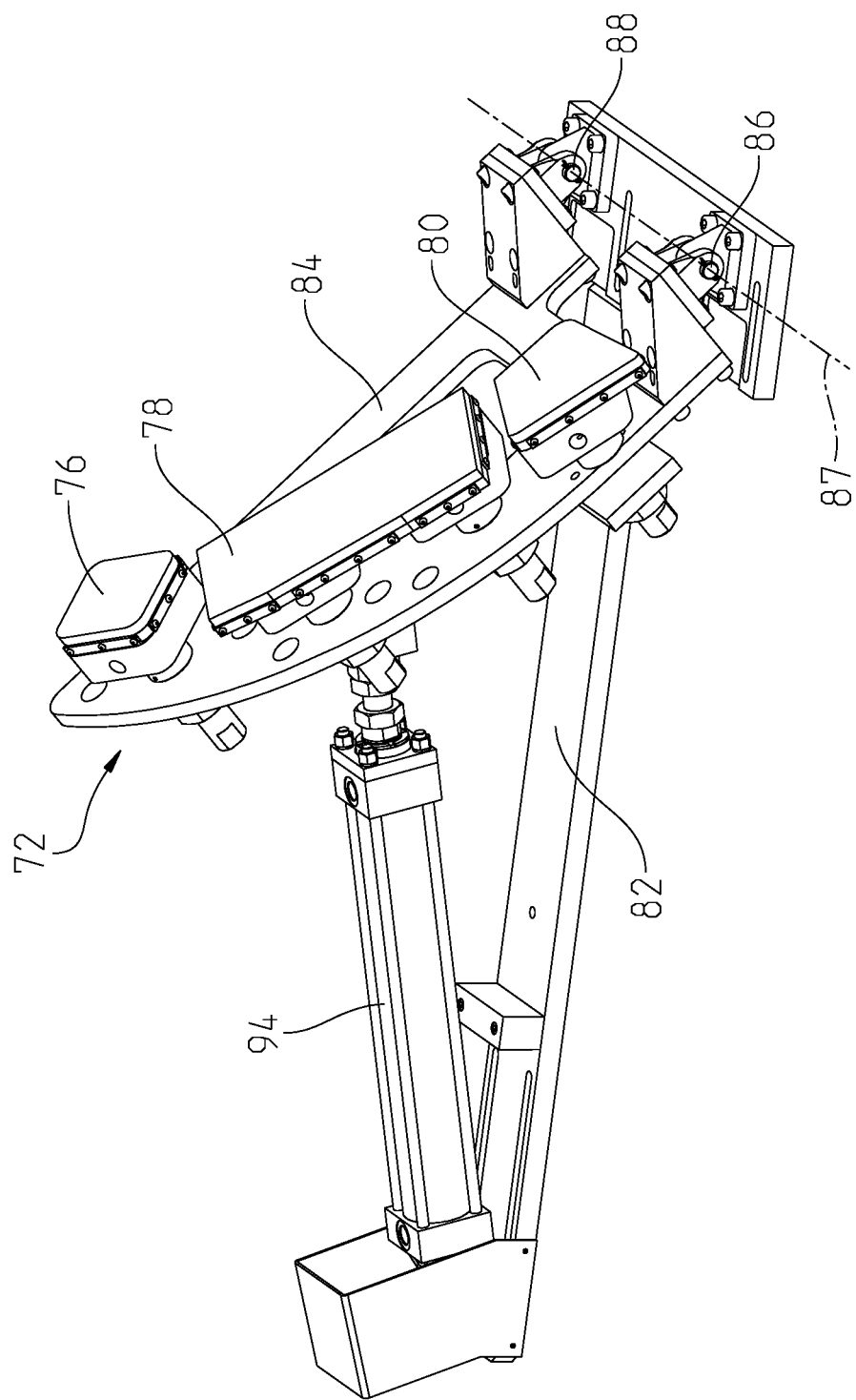
FIG. 15 is an isometric view of a front clamping assembly.

The front clamp 70 is made up of a first side 72 and a second side 74. The second side 74 is a mirror image of the first side 72 and shares the same components. The first side 72, shown individually in FIG. 15, has a lower frame member 82 that is affixed to the base frame 12 and holds the pivots 86, 88 and one end and the actuator 94. The other end of the actuator 94 is connected to a pad holder 84 that holds a plurality of pressure pads 76, 78, 80. The pad holder 84 pivots about a pad pivot axis 87, which is perpendicular to the lower frame member 82. The pad pivot axis 87 is obliquely angled with respect to the plane of symmetry 138. In addition, due to the desired shape of the completed nose cone assembly, the pad pivot axis 87 is obliquely angled with respect to strap pivot axis 41. The lower frame member 82 allows the first side 72 to be easily positioned with respect to the frame and mandrel 20 while keeping the pivots, actuator, and pad holder in alignment. The pressure pads are attached to the pad holder 84 by mechanisms that allow each of the pressure pads to independently pivot or swivel. In the embodiment shown herein, the pressure pads are attached to the pad holder 84 through a ball joint connection. The spherical pivoting or swiveling connection of the pressure pad to the pad holder 84 allows it to make positive contact with the blank 100 and remain in flat contact with it as the side is being clamped. This prevents dents or distortion. It is contemplated that the pressure pads are fixed with respect to the first side 72. As previously described, the second side 74 is a mirror image of the first side with pressure pads and pivots. The first and second sides 72, 74 move between a clamped position and an unclamped position using actuators 94, 96. The actuators 94, 96 are position-based and are moved to programmed positions, but it is contemplated that open-loop movement of the actuators is possible and mechanical stops are used to control the clamped and unclamped positions. It is further contemplated that the pressure pads may be a continuous structure or the number of pads would be different than what is shown in the FIGS. The pressure pads are individually adjustable to conform the rolled blank 110 to the final shape of the nose cone when the front clamp 70 is in the clamped position.

The actuators and robot are connected to a control system that executes a program to monitor sensors and control the position of the robot and various actuators. The actuators 44, 46, 64, 66, 94, 96 include position feedback that is communicated to the control system. Optionally the actuators that move the locator bar 22 include sensors that are in communication with the control system. An optional edge tracking device is attached to the robotic welder 26 adjacent the weld head 28 to provide position information of a seam to the control system and/or robotic welder. In addition to the position feedback, the actuators may also provide force or pressure feedback to the control system. Actuators that move the locator bar 22 are also in communication with and controlled by the control system.

Figure 9:
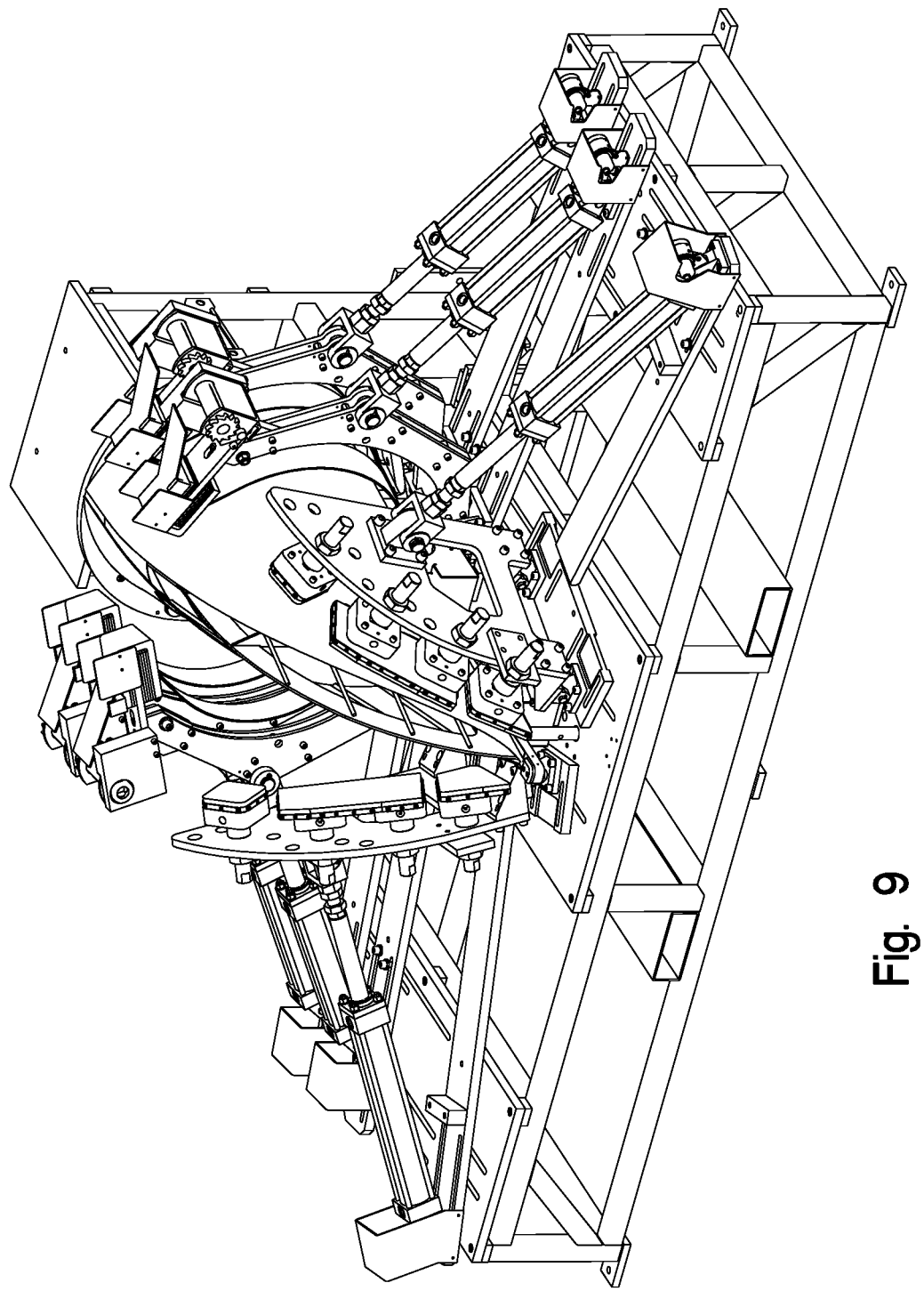
FIG. 9 is an isometric view of the machine in FIG. 8 at the beginning of the clamping process.
Figure 10:
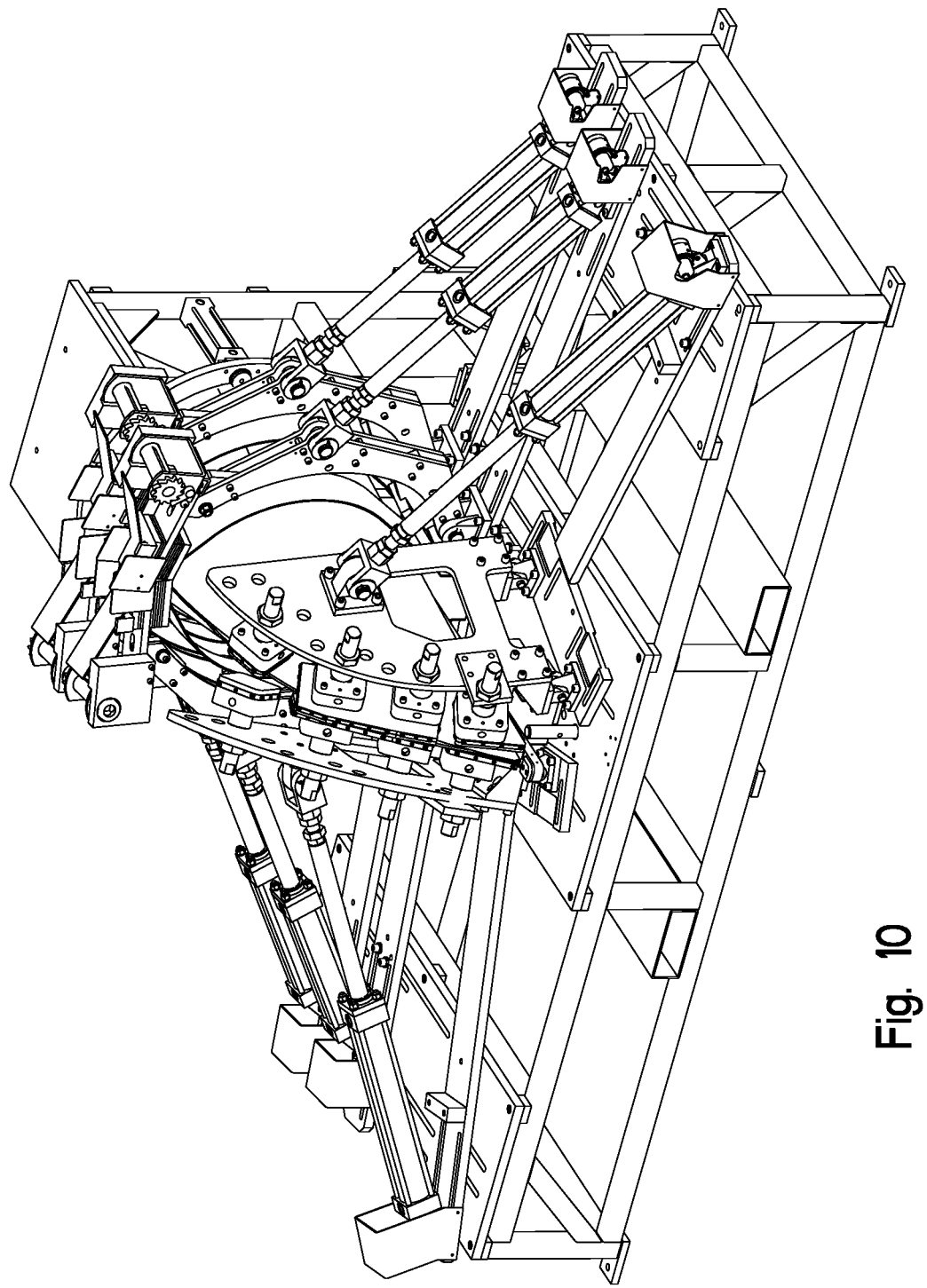
FIG. 10 is an isometric view of the machine in FIG. 9 with the rolled blank fully clamped.
Figure 11:
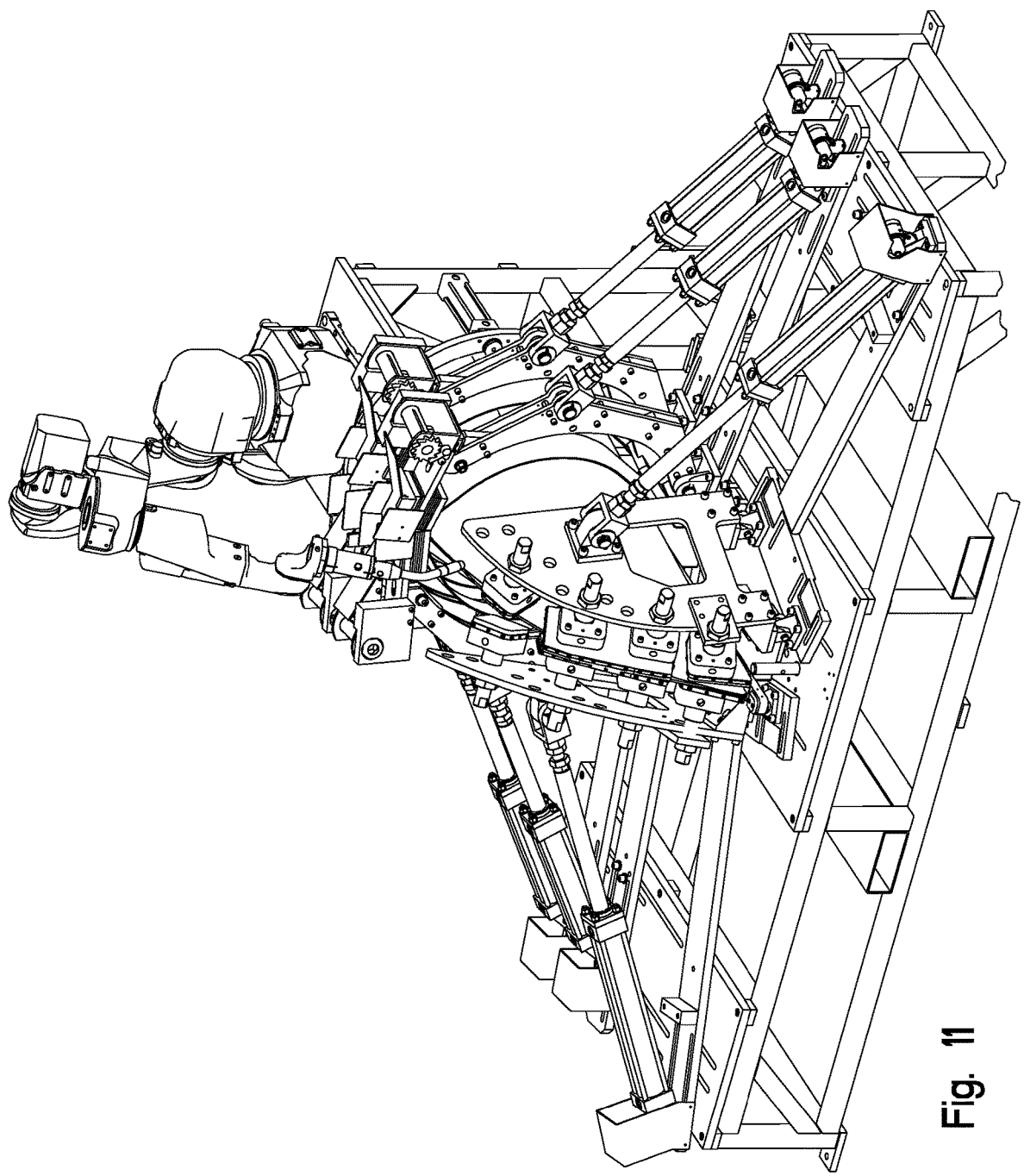
FIG. 11 is an isometric view of the machine in FIG. 10 during the welding process.
Figure 12:
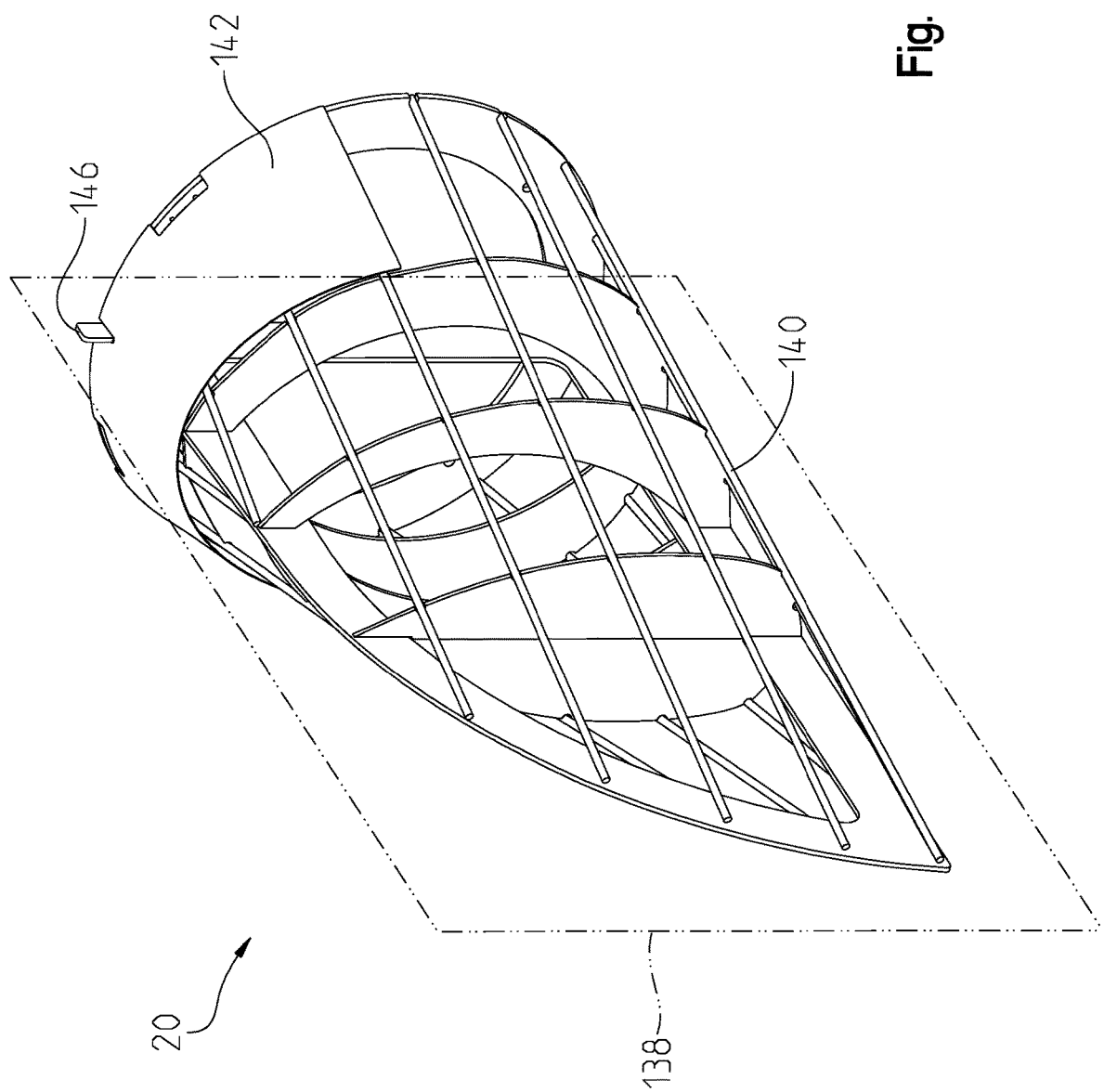
FIG. 12 is an isometric view of the mandrel.

As previously described, the mandrel 20 is affixed to the riser frame 24, but it is contemplated that it is affixed to a different portion of the machine, such as the base frame 12. Shown in FIGS. 12 and 13, the mandrel 20 is a support and shaping structure that cooperates with the band clamps 30, 50 and front clamp 70 to shape a rolled blank 110 into a completed nose cone assembly. The mandrel 20 is a rigid skeleton structure formed from plates and wire. It is sized to cooperate with the rolled blank 110 so that half of a front edge 106 meets the other half of the front edge 106 when clamped, as shown in FIGS. 9-10. The mandrel 20 has a bottom spine 140 that cooperates with the locator bar 22 to trap the rolled blank 110 and center it. The locator bar 22 is movable between a released position, where it is spaced from the mandrel 20, and a trapped position where it is moved close to the mandrel 20 and presses the rolled blank 110 against the bottom spine 140. In FIG. 13, the locator bar 22 is shown in the trapped position. The mandrel 20 may also include a sliding surface 142 and a stop 146. The sliding surface 142 allows the edges of the rolled blank 110 to slide as it is being clamped without catching. The stop 146 prevents overlapping of the front edges 106 as the rolled blank 110 is being clamped.

As shown, the robotic welder 26 has a welding head 28 that is used to join the front edge 106. The robotic welder 26 may include a seam tracking device (not shown) for communicating to a control system and tracking where the front edges 106 meet. The seam tracking device (if included) is used for closed-loop position control of the welding head 28.

Figure 6:
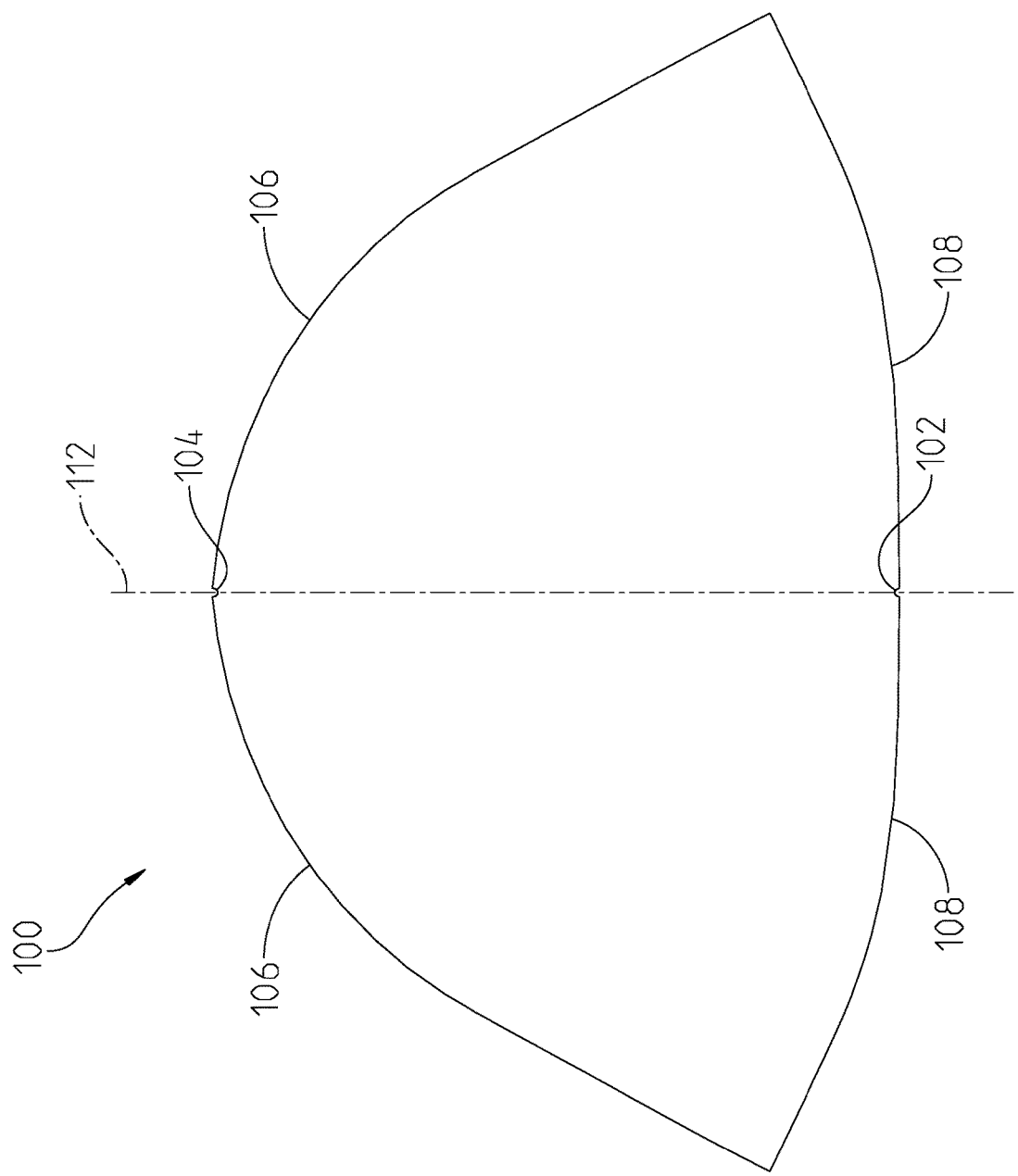
FIG. 6 is a top view of a cut blank.

The blank 100 starts out as a cut shape out of flat material (typically a sheet of aluminum) with a profile matching or similar to the shape shown in FIG. 6. As shown, the blank 100 is mirror symmetrical and has a first locating notch 102 and a second locating notch 104. The first locating notch 102 is centered on a rear edge 108 and the second locating notch 104 is centered on a front edge 106. The blank 100 has a line of symmetry that intersects the midpoint of the front edge 106 and rear edge 108. In addition, the notches 102, 104 are located on the line of symmetry 112. The notches 102, 104 correspond to locating pins 132, 134 on the locator bar 22. When the blank 100 is placed on the locator bar 22, the line of symmetry 112 aligns with the plane of symmetry 138. The plane of symmetry is centered on the mandrel and is aligned with section line 13-13 in FIG. 3 and in FIG. 13.

Figure 7:
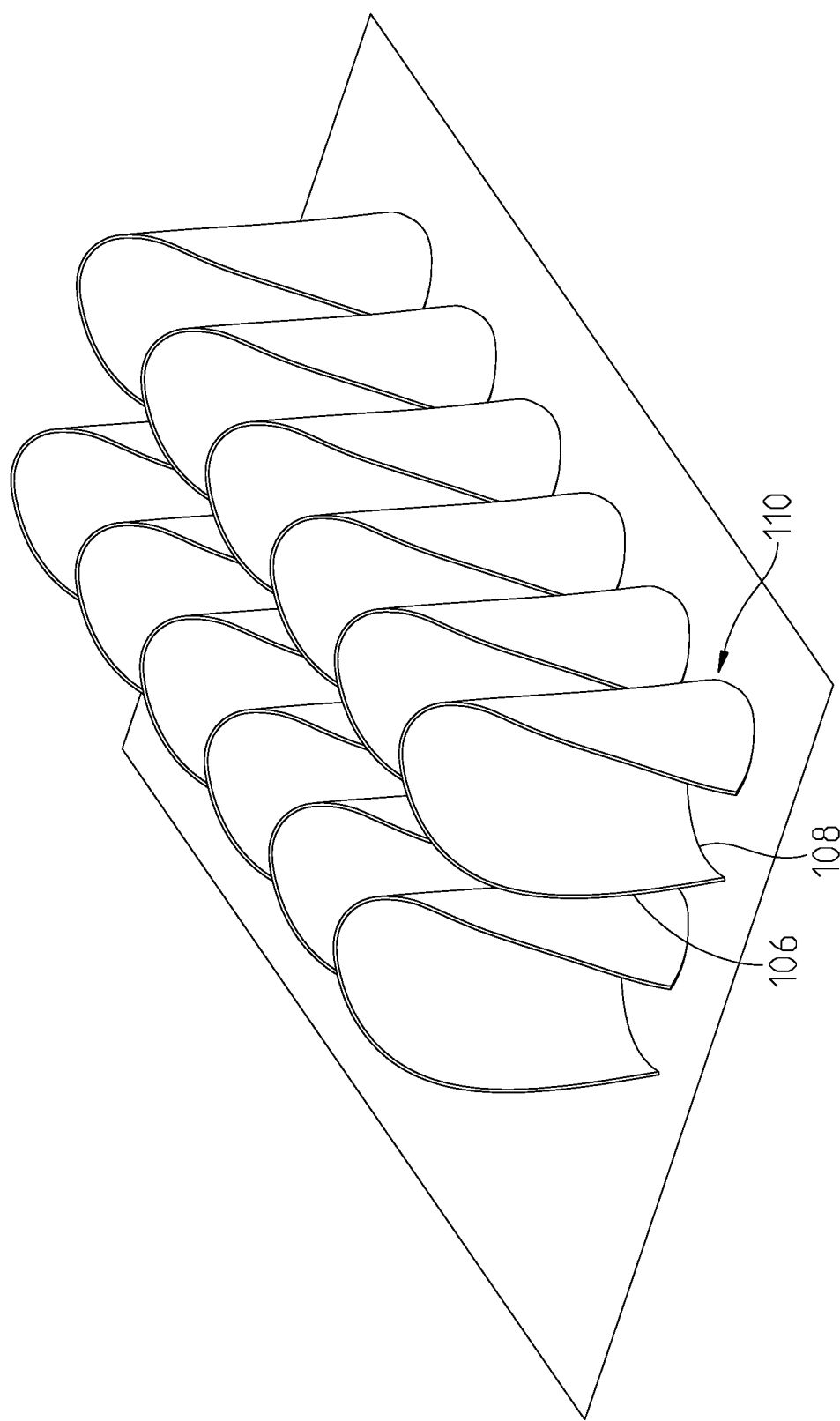
FIG. 7 is an isometric view of a plurality of rolled blanks.

To form a nose cone assembly, the rolled blank 110 that is pre-cut to a shape including two locating notches is placed on the centerline or line of symmetry 112 of the blank 100. As previously described, one notch 104 is located on the nose and one notch 102 is located on the tail end of the blank. As cut, the cut blank 100 is a flat or planar component. Before being placed on the nose cone forming machine 10, the cut blank 100 is rolled to be generally cylindrical, such as the rolled blanks 110 shown in FIG. 7. Rolling a flat component, such as the cut blank 100, is accomplished through standard slip rolling or other tooling to give the cut blank 100 a curve.

Figure 8:
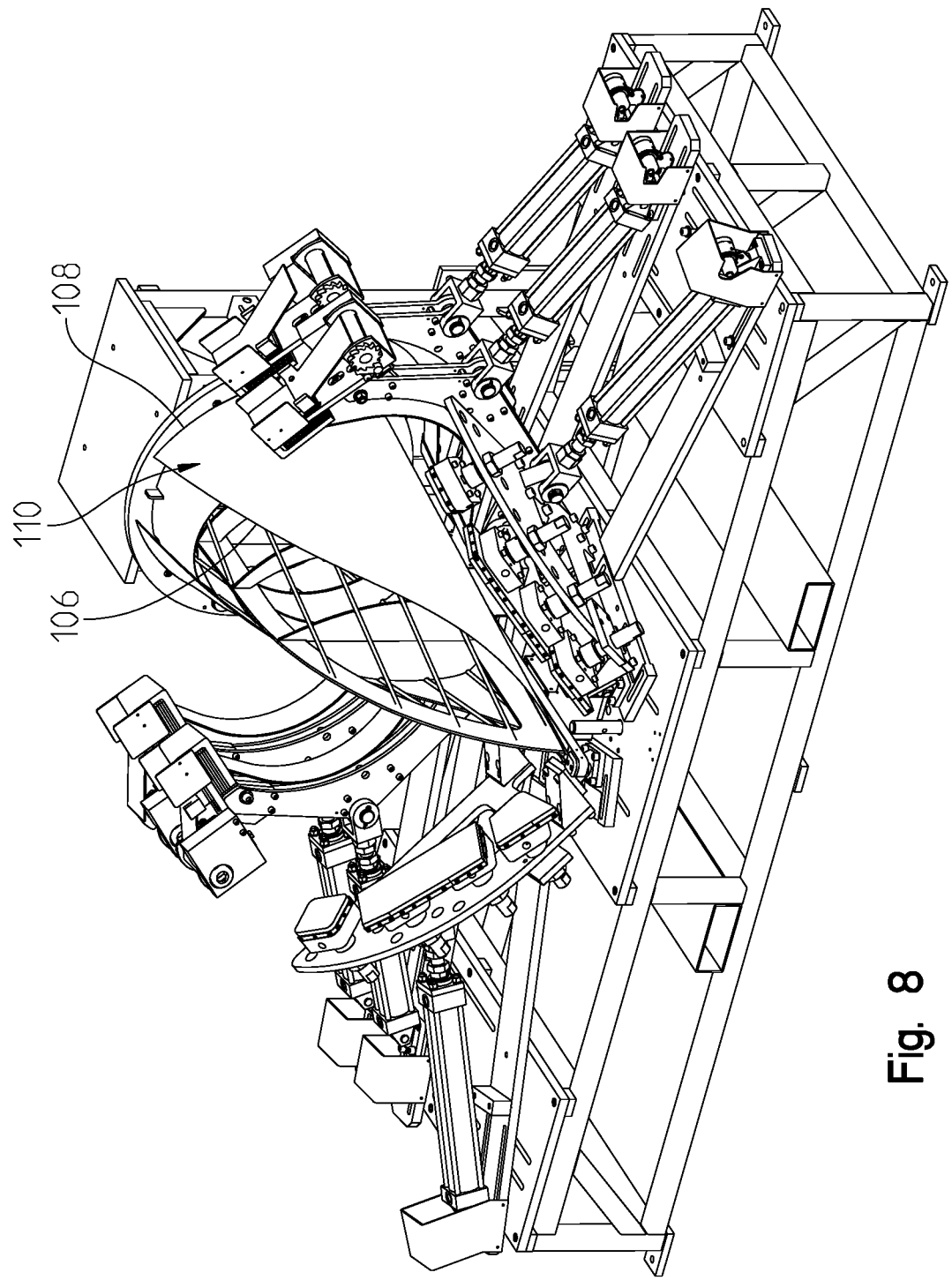
FIG. 8 is an isometric view of a rolled blank located on the machine and clamped by a locator bar.

The rolled blank 110 is placed on top of the locator bar 22 which registers and locates the blank 100 on two pins 132, 134 engaging in the notches 102, 104 in the blank. As shown, the curve of the rolled blank 110 faces up but it is contemplated that the mandrel 20 is inverted or at another orientation. In any event, the rolled blank 110 is placed so it partially surrounds the mandrel 20, as shown in FIG. 8. It is contemplated that the notches align with features on the mandrel 20 instead of the pins 132, 134. Because the notches are located on the line of symmetry 112, the pins 132, 134 on the locator bar 22 center the rolled blank 110 on the mandrel 20. This allows half of the front edge 106 to make contact with the other half of the front edge 106 when clamped. The locator bar 22 positions the rolled blank 110 with respect to the mandrel 20 and the control system moves the locator bar 22 to lift the rolled blank 110 until it contacts the bottom spine 140 on the mandrel 20. The rear band clamp 30, center band clamp 50, and front clamp 70 are moved toward their clamped positions, shown in FIGS. 8-11. The clamped positions of the clamps are predetermined and controlled by the control system. The control system can be programmed for the clamps to move in a sequence of positions, with some of the clamps moving partially towards their clamped position, and then moving to be fully clamped. FIG. 8 shows the locator bar 22 in the position to trap the rolled blank 110 to the mandrel 20. FIG. 9 shows the clamps 30, 50, 70 moving to the clamped position. FIG. 10 shows the front clamp 70 moving to the clamped position. As the clamps 30, 50, 70 move to the clamped position, the halves of the front edge 106 slide along the surfaces of the mandrel 20 and touch. Once the front edges 106 are touching, the robotic welder 26 initiates and makes a series of tack welds along a seam formed by the touching front edges 106. At this time, the edge tracking device feeds information to the robotic welder 26 to adjust the position of the welding head 28 to ensure the weld is properly placed at the seam. The welder 26 then makes a continuous weld along the entire seam. The robot, the clamps, and the locator bar 22 retract. Optional push-off cylinders, located near or at the rear edge 108 and controlled by the control system, dislodge the completed nose cone from the mandrel 20. The nose cone is then removed by the operator.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A system for welding a nose cone from a cut blank, said cut blank having a front edge and a rear edge, said cut blank having a line of symmetry intersecting a midpoint of said front edge and said rear edge, said system comprising:
   a mandrel having a spine located on a plane of symmetry;
   a locator bar moveable between a trapped position and a released position by an actuator, said trapped position defined by said locator bar at a close position where it presses the blank against the spine, said released position defined by said locator bar at a far position spaced from said spine, said plane of symmetry intersecting said locator bar;
   a first strap holder pivotable about a first strap pivot axis, said first strap pivot axis is obliquely angled with respect to said plane of symmetry, a first clamp actuator connected to said first strap holder for moving said first strap holder between a clamped position and an unclamped position, said first strap holder having a first strap for contacting said cut blank in said clamped position;
   a second strap holder pivotable about a second strap pivot axis, said second strap pivot axis is obliquely angled with respect to said plane of symmetry, a second clamp actuator connected to said second strap holder for moving said second strap holder between a clamped position and an unclamped position, said second strap holder having a second strap for contacting said cut blank in said clamped position;
   said first strap pivot axis is mirror symmetrical to said second strap pivot axis about said plane of symmetry;
   a first pad clamp having a first pad holder pivotable about a first pad pivot axis, said first pad pivot axis is obliquely angled with respect to said plane of symmetry and obliquely angled with respect to said first strap pivot axis, a first pad actuator connected to said first pad clamp for moving said first pad holder between a clamped position and an unclamped position, said first pad holder having a first spherically pivotable pad for contacting said cut blank in said clamped position;
   a second pad clamp having a second pad holder pivotable about a second pad pivot axis, said second pad pivot axis is obliquely angled with respect to said plane of symmetry and obliquely angled with respect to said second strap pivot axis, a second pad actuator connected to said second pad clamp for moving said second pad holder between a clamped position and an unclamped position, said second pad holder having a second spherically pivotable pad for contacting said cut blank in said clamped position;
   a robotic welder; and
   a control system in communication with said actuators and said robotic welder, said control system for moving said actuators.

2. The system of claim 1, further comprising a sensor to detect said front edge, said sensor affixed to said robot and in communication with said control system.

3. The system of claim 1, further comprising a locating feature on said locator bar for aligning said cut blank on said line of symmetry.

4. The system of claim 3, wherein said locating feature is a pin and said cut blank has a complementary notch located on said line of symmetry.

5. The system of claim 1, further comprising a third strap holder adjacent said first strap holder, said third strap holder pivotable about a third strap pivot axis, a fourth strap holder adjacent said second strap holder, said fourth strap holder pivotable about a fourth strap pivot axis.

6. The system of claim 5, wherein said third strap pivot axis is parallel to said first strap pivot axis and said fourth strap pivot axis is parallel to said second strap pivot axis.

7. A system for welding a nose cone from a cut blank, said cut blank having a front edge, a rear edge, and a line of symmetry intersecting a midpoint of said front edge and said rear edge, said system comprising:
   a mandrel having a spine located on a plane of symmetry;
   a locator bar moveable between a trapped position and a released position by an actuator, said trapped position defined by said locator bar at a close position where it presses the blank against the spine, said released position defined by said locator bar at a far position spaced from said spine, said plane of symmetry extending through said locator bar;
   a first strap holder pivotable about a first strap pivot axis, said first strap pivot axis is obliquely angled with respect to said plane of symmetry, a first clamp actuator connected to said first strap holder for moving said first strap holder between a clamped position and an unclamped position, said first strap holder having a first strap for contacting said cut blank in said clamped position;
   a second strap holder pivotable about a second strap pivot axis, said second strap pivot axis is obliquely angled with respect to said plane of symmetry, a second clamp actuator connected to said second strap holder for moving said second strap holder between a clamped position and an unclamped position, said second strap holder having a second strap for contacting said cut blank in said clamped position;
   said first strap pivot axis is mirror symmetrical to said second strap pivot axis about said plane of symmetry;
   a first pad clamp having a first pad holder pivotable about a first pad pivot axis, said first pad pivot axis is obliquely angled with respect to said plane of symmetry and obliquely angled with respect to said first strap pivot axis, a first pad actuator connected to said first pad clamp for moving said first pad holder between a clamped position and an unclamped position, said first pad holder having a first spherically pivotable pad for contacting said cut blank in said clamped position; and
   a second pad clamp having a second pad holder pivotable about a second pad pivot axis, said second pad pivot axis is obliquely angled with respect to said plane of symmetry and obliquely angled with respect to said second strap pivot axis, a second pad actuator connected to said second pad clamp for moving said second pad holder between a clamped position and an unclamped position, said second pad holder having a second spherically pivotable pad for contacting said cut blank in said clamped position.

8. The system of claim 7, further comprising a locating feature on said locator bar for aligning said cut blank on said line of symmetry.

9. The system of claim 8, wherein said locating feature is a pin and said cut blank has a complementary notch located on said line of symmetry.

10. The system of claim 7, further comprising a third strap holder adjacent said first strap holder, said third strap holder pivotable about a third strap pivot axis, a fourth strap holder adjacent said second strap holder, said fourth strap holder pivotable about a fourth strap pivot axis.

11. The system of claim 10, wherein said third strap pivot axis is parallel to said first strap pivot axis and said fourth strap pivot axis is parallel to said second strap pivot axis.

12. The system of claim 7, further comprising a robotic welder.

13. The system of claim 12, further comprising a control system in communication with said actuators and said robotic welder, said control system controlling positions of said actuators.

14. The system of claim 13, further comprising a sensor to detect said front edge, said sensor affixed to said robot and in communication with said control system.

15. A method for forming and seaming a cut blank into a nose cone, said method comprising:
   cutting a blank from sheet material, said cut blank having a line of symmetry intersecting a midpoint of a front edge and a midpoint of a rear edge;
   rolling said cut blank to form a rolled blank;
   providing a mandrel having a spine located on a plane of symmetry;
   providing a locator bar adjacent said spine;
   placing said rolled blank between said mandrel and said locator bar;
   clamping said rolled blank to said spine with said locator bar and aligning said line of symmetry to said plane of symmetry;
   providing a band clamp having a first side and a second side, each said side having a corresponding strap pivot axis obliquely angled with respect to said plane of symmetry, each said side having a corresponding strap;
   providing a first pad clamp and a second pad clamp, each said pad clamp having a corresponding pad being pivotable with respect thereto;
   moving said band clamp to a predetermined position to press said rolled blank into contact with said mandrel;
   moving said pad clamps to a predetermined position to move portions of said front edge into contact with other portions of said front edge; and
   welding said portions of said front edge together.

16. The method of claim 15, wherein said strap pivot axes of said band clamp are mirror symmetrical about said plane of symmetry.

17. The method of claim 15, wherein said first pad clamp pivots about a first pad axis and said second pad clamp pivots about a second pad axis, said first and second pad axes are obliquely angled with respect to said strap pivot axes.

18. The method of claim 15, further providing a robotic welder for said welding.

19. The method of claim 18, further providing a control system in communication with said actuators and said robotic welder.

* * * * *